US012488751B2

(12) United States Patent

Liu et al.

(10) Patent No.: US 12,488,751 B2
(45) Date of Patent: Dec. 2, 2025

(54) PIXEL CIRCUIT AND DISPLAY PANEL

(71) Applicants: HEFEI VISIONOX TECHNOLOGY CO., LTD., Anhui (CN); VISIONOX TECHNOLOGY INC., Jiangsu (CN)

(72) Inventors: Yunjie Liu, Hefei (CN); Yongqiang Du, Hefei (CN); Chunlei Zhang, Hefei (CN)

(73) Assignees: Hefei Visionox Technology Co., Ltd., Hefei (CN); Visionox Technology Inc., Suzhou (CN)

( * ) Notice: Subject to any disclaimer, the term of this patent is extended or adjusted under 35 U.S.C. 154(b) by 0 days.

(21) Appl. No.: 18/644,405

(22) Filed: Apr. 24, 2024

(65) Prior Publication Data

US 2024/0312410 A1 Sep. 19, 2024

Related U.S. Application Data

(63) Continuation of application No. PCT/CN2023/135357, filed on Nov. 30, 2023.

(30) Foreign Application Priority Data

Mar. 15, 2023 (CN) ........................ 202310269034.X
Apr. 27, 2023 (CN) ........................ 202310479495.X

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0814* (2013.01);
(Continued)

(58) Field of Classification Search
CPC ................... G09G 3/3233; G09G 3/32; G09G 2300/0814; G09G 2300/0842;
(Continued)

(56) References Cited

U.S. PATENT DOCUMENTS 9,093,027 B2 * 7/2015 Jin ........................ G09G 3/3233
9,478,159 B2 * 10/2016 Choi .................... G09G 3/3291
(Continued)

FOREIGN PATENT DOCUMENTS

CN 105761675 A 7/2016
CN 106023895 A 10/2016
(Continued)

OTHER PUBLICATIONS

International Search Report issued Feb. 19, 2024, in corresponding International Application No. PCT/CN2023/135357, 17 pages.

*Primary Examiner* — David Tung
(74) *Attorney, Agent, or Firm* — Maier & Maier, PLLC

(57) ABSTRACT

A pixel circuit includes a drive circuit, a data write circuit, and a light-emitting device; the data write circuit is connected between a data line and the drive circuit and is configured to transmit a data voltage of the data line to the drive circuit during a data writing stage; the drive circuit is connected between a power line and a first electrode of the light-emitting device, a second electrode of the light-emitting device is connected to the data line, and during a light emission stage, a second power voltage is transmitted to the second electrode of the light-emitting device through the data line connected to the second electrode of the light-emitting device.

20 Claims, 11 Drawing Sheets

(52) U.S. Cl.
CPC ............... *G09G 2300/0819* (2013.01); *G09G 2300/0842* (2013.01); *G09G 2300/0861* (2013.01); *G09G 2310/08* (2013.01); *G09G 2330/021* (2013.01)

(58) Field of Classification Search
CPC ....... G09G 2300/0861; G09G 2310/08; G09G 2330/021
See application file for complete search history.

(56) References Cited

U.S. PATENT DOCUMENTS

| | | | | |
|---|---|---|---|---|
| 11,249,580 | B2 * | 2/2022 | Huang | G06F 3/0412 |
| 11,579,717 | B2 * | 2/2023 | Lee | G06F 3/04166 |
| 11,948,507 | B2 * | 4/2024 | Yin | G09G 3/3233 |
| 12,198,634 | B2 * | 1/2025 | Chen | G09G 3/3225 |
| 2002/0050962 | A1 * | 5/2002 | Kasai | G09G 3/325<br>345/76 |
| 2004/0056605 | A1 * | 3/2004 | Yoshida | G09G 3/3233<br>315/169.3 |
| 2013/0293600 | A1 * | 11/2013 | Lee | G09G 3/3258<br>345/691 |
| 2014/0049182 | A1 | 2/2014 | Kawae et al. | |
| 2014/0333214 | A1 * | 11/2014 | Okuno | G09G 3/32<br>315/172 |
| 2019/0019452 | A1 * | 1/2019 | Zhu | G09G 3/3266 |
| 2019/0108790 | A1 * | 4/2019 | Liang | H10K 59/80521 |
| 2020/0202797 | A1 * | 6/2020 | Cho | G09G 3/3233 |
| 2021/0335234 | A1 * | 10/2021 | Yin | G09G 3/3291 |

FOREIGN PATENT DOCUMENTS

| | | | |
|---|---|---|---|
| CN | 106205489 | A | 12/2016 |
| CN | 206210357 | U | 5/2017 |
| CN | 110021266 | A | 7/2019 |
| CN | 115035861 | A | 9/2022 |
| CN | 115527488 | A | 12/2022 |
| JP | 2014219516 | A | 11/2014 |

* cited by examiner

PIXEL CIRCUIT AND DISPLAY PANEL

CROSS-REFERENCE TO RELATED APPLICATION(S)

This is a continuation of International Patent Application NO. PCT/CN2023/135357, filed Nov. 30, 2023, which claims priority to Chinese Patent Application No. 202310269034.X filed with the China National Intellectual Property Administration (CNIPA) Mar. 15, 2023 and Chinese Patent Application No. 202310479495.X filed with the CNIPA Apr. 27, 2023, the disclosures of which are incorporated herein by reference in their entireties.

TECHNICAL FIELD

The present disclosure relates to the field of display technology, for example, a pixel circuit and a display panel.

BACKGROUND

With the rapid development of display technology, organic light-emitting diode (OLED) display panels have become the current hot research topic in the field because of their properties such as low power consumption, low production cost, and self-emission.

The display panel generally includes a pixel circuit, and the pixel circuit includes a drive transistor and a light-emitting element. The drive transistor generates a drive current according to a data voltage to drive the light-emitting element to emit light, and the brightness of the light-emitting element can be adjusted by changing the data voltage. However, the power consumption of the display panel is relatively large and thus the market requirements cannot be met.

SUMMARY

The present disclosure provides a pixel circuit and a display panel.

A pixel circuit is provided. The pixel circuit includes a drive circuit, a data write circuit, and a light-emitting device.

The data write circuit is connected between a data line and the drive circuit and is configured to transmit a data voltage of the data line to the drive circuit during a data writing stage.

A second electrode of the light-emitting device is connected to the data line, and during a light emission stage, a second power voltage is transmitted to the second electrode of the light-emitting device through the data line.

The drive circuit is connected between a power line and a first electrode of the light-emitting device and is configured to generate a drive current according to a voltage of a control terminal of the drive circuit during the light emission stage to drive the light-emitting device to emit light. The power line is configured to transmit a first power voltage.

A pixel circuit is provided. The pixel circuit includes a drive circuit, a data write circuit, a light-emitting device, and an auxiliary circuit.

The data write circuit is connected to the drive circuit and is configured to transmit a data voltage to the drive circuit.

The drive circuit is connected between a power line and a first electrode of the light-emitting device and is configured to generate a drive current according to a voltage of a control terminal of the drive circuit to drive the light-emitting device to emit light. The power line is configured to transmit a first power voltage.

The auxiliary circuit is connected to a second electrode of the light-emitting device and is configured to transmit a second power voltage to the second electrode of the light-emitting device.

A display panel is provided. The display panel include multiple data lines and multiple pixel circuits. The multiple pixel circuits are arranged in an array; and in a same pixel circuit, the data write circuit is connected to one of the multiple data lines, and the second electrode of the light-emitting device is connected to the one of the multiple data lines or another one of the multiple data lines.

The multiple data lines extend in a first direction and are arranged in a second direction, the first direction and the second direction intersect each other, and each of the multiple data lines is connected to the data write circuits of the pixel circuits in a same column among the multiple pixel circuits; each data line is configured to transmit the data voltage and the second power voltage in a time-sharing manner.

In the same pixel circuit, when the second electrode of the light-emitting device is connected to another one of the multiple data lines, a second power voltage transmitted during the light emission stage by the data line connected to the second electrode of the light-emitting device is different from a second power voltage transmitted during the light emission stage by the data line connected to the data write circuit.

DETAILED DESCRIPTION

It is to be noted that the terms "first", "second" and the like in the description, claims and drawings of the present disclosure are used to distinguish between similar objects and are not necessarily used to describe a particular order or sequence. It is to be understood that data used in this manner is interchangeable in appropriate cases so that the embodiments of the present disclosure described herein can also be implemented in an order not illustrated or described herein. In addition, the terms "including", "having", and any other variations thereof are intended to cover a non-exclusive inclusion. For example, a process, a method, a system, a product, or a device that includes a series of steps or units may include not only the expressly listed steps or units but also other steps or units that are not expressly listed or are inherent to the process, the method, the product, or the device.

As described in BACKGROUND, the display panel has high power consumption. The applicant has found that the cause of the above-mentioned situation is as follows: The display panel includes sub-pixels of different emitted colors, and the multiple sub-pixels are arranged in an array. Since the cathode layer of the display panel is manufactured as one surface, all sub-pixels share one cathode layer, that is, the cathodes of all sub-pixels are connected to the same voltage. The material properties of the sub-pixels of different emitted colors are not completely the same, so different sub-pixels do not require the same cathode voltage. When all sub-pixels share one cathode layer, the cathode voltage transmitted from the cathode layer is based on the sub-pixel that requires the highest cathode voltage among the multiple sub-pixels to enable all the sub-pixels to work properly. However, the configuration described above may cause an increase in the power consumption of other sub-pixels, resulting in an increase in the overall power consumption of the panel.

Figure 1:
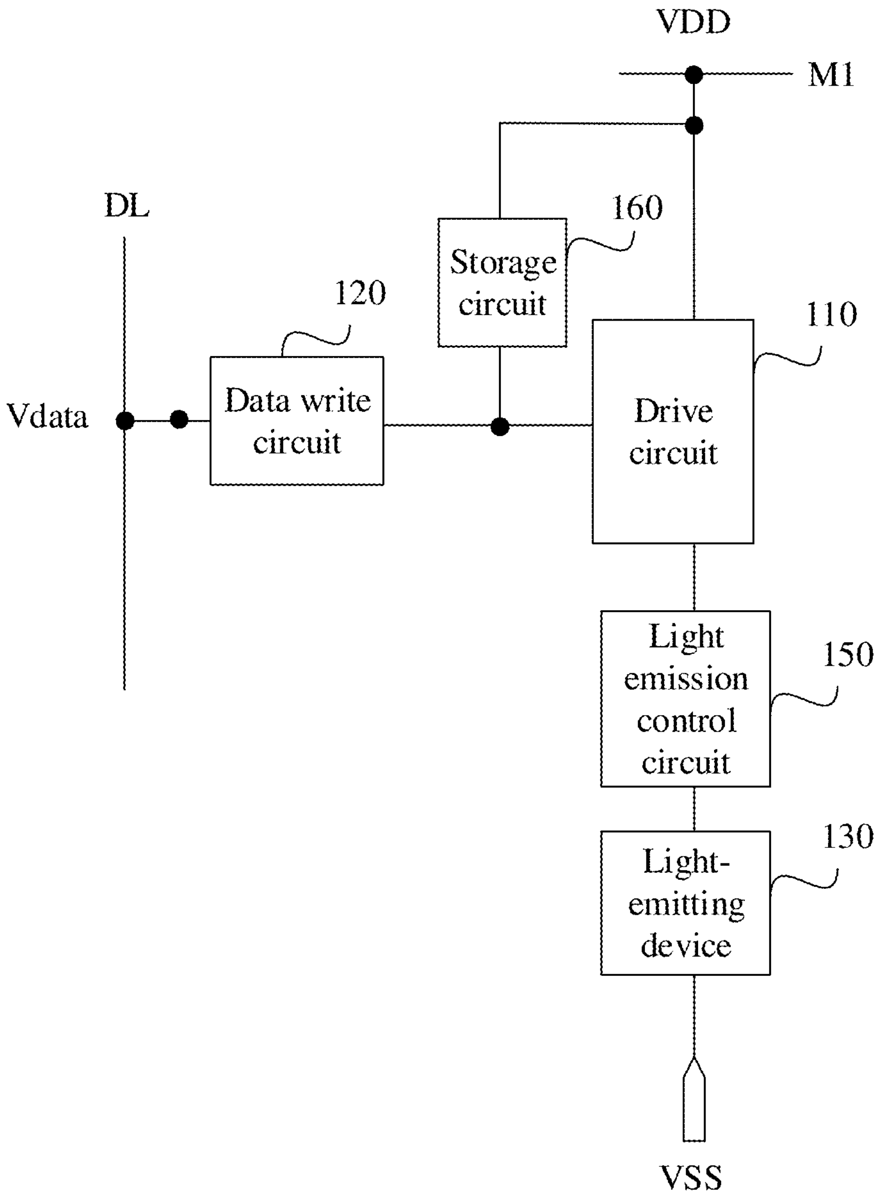
FIG. 1 is a structural diagram of a pixel circuit according to an embodiment of the present disclosure.

For the above-mentioned situation, the embodiments of the present disclosure provide a pixel circuit. FIG. 1 is a structural diagram of a pixel circuit according to an embodiment of the present disclosure. With reference to FIG. 1, the pixel circuit includes a drive circuit 110, a data write circuit 120, and a light-emitting device 130. The data write circuit 120 is connected between a data line DL and the drive circuit 110 and is configured to transmit a data voltage Vdata on the data line DL to the drive circuit 110 during a data writing stage. The drive circuit 110 is connected between a power line M1 and a first electrode of the light-emitting device 130 and is configured to generate a drive current according to a voltage of a control terminal of the drive circuit 110 during a light emission stage to drive the light-emitting device 130 to emit light. A second electrode of the light-emitting device 130 is connected to the data line DL, and during the light emission stage, a second power voltage VSS is transmitted to the second electrode of the light-emitting device 130 through the data line connected to the second electrode of the light-emitting device 130.

In the embodiment of the present disclosure, a circuit may also be understood as a module. For example, a drive circuit may be understood as a drive module, a data write circuit may be understood as a data write module, and so on.

For example, the power line M1 is configured to transmit a first power voltage VDD, and when a conduction path is formed between the power line M1 and the second electrode of the light-emitting device 130, the drive circuit 110 generates a drive current according to the voltage of the control terminal of the drive circuit 110 to drive the light-emitting device 130 to emit light. The light-emitting device 130 may include a light-emitting diode. The light-emitting diode includes an anode, a hole injection layer, a hole transport layer, a light-emitting layer, an electron transport layer, an electron injection layer, and a cathode. The anode and the cathode are configured to access corresponding power voltages, respectively. For example, the anode accesses the first power voltage VDD, the cathode accesses a second power voltage VSS (that is, a cathode voltage), and the first power voltage VDD may be higher than the second power voltage VSS. Herein, the first electrode of the light-emitting device 130 may be an anode, the second electrode of the light-emitting device 130 may be a cathode, and the light-emitting layer materials of the light-emitting diodes of different emitted colors are different.

In this embodiment, for the same pixel circuit, the data line DL connected to the second electrode of the light-emitting device 130 and the data line DL connected to the data write circuit 120 are the same data line DL or the data line DL connected to the second electrode of the light-emitting device 130 and the data line DL connected to the data write circuit 120 are two different data lines DL. In other words, the data line DL transmits the data voltage Vdata and the second power voltage VSS in a time-sharing manner, and when the light-emitting device 130 emits light, the second power voltage VSS is provided for the light-emitting device 130 by reusing the corresponding data line DL. Therefore, the scheme described above can achieve the separate control on the voltage accessed by the second electrode of the light-emitting device 130, to provide different second power voltages VSS for different light-emitting devices 130.

Figure 2:
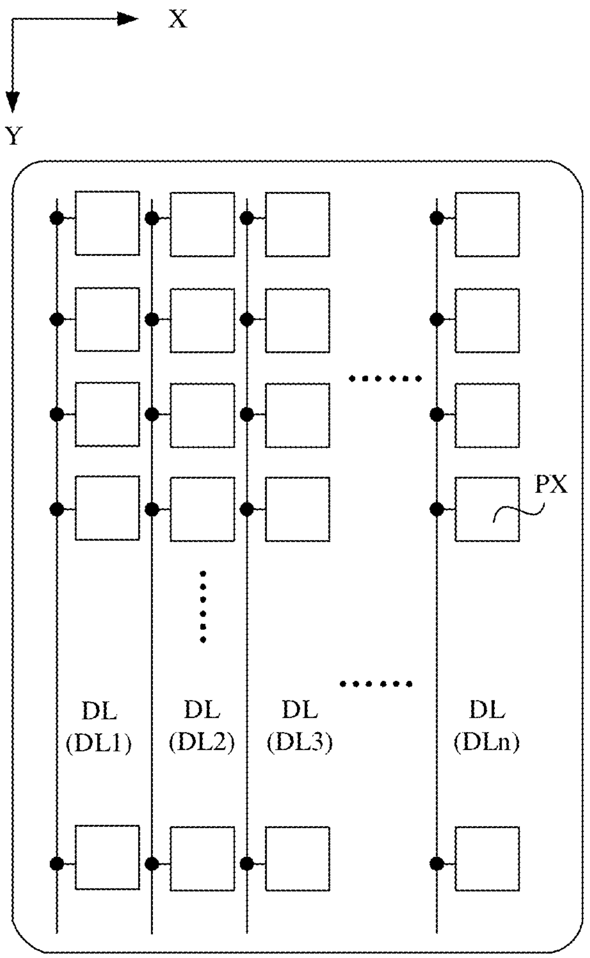
FIG. 2 is a structural diagram of a display panel according to an embodiment of the present disclosure.

In one implementation, FIG. 2 is a structural diagram of a display panel according to an embodiment of the present disclosure. With reference to FIG. 2, in a display panel, multiple sub-pixel units PX are arranged in an array, and each sub-pixel unit PX corresponds to one light-emitting device 130. Multiple data lines DL extend in a column direction Y and are arranged in sequence in a row direction X, and each data line DL is correspondingly connected to one column of sub-pixels. According to the arrangement of the sub-pixels, during the light emission stage, the multiple data lines DL may each separately provide a second power voltage VSS for a corresponding column of sub-pixels so that the second power voltages VSS corresponding to at least part of the sub-pixels of different emitted colors are separately controlled. Illustratively, the multiple sub-pixel units PX include first sub-pixel units, second sub-pixel units, and third sub-pixel units. The first sub-pixel units, the second sub-pixel units, and the third sub-pixel units have different emitted colors. The first sub-pixel units and the second sub-pixel units are arranged alternately to form one column (for example, an odd-numbered column) of sub-pixels, multiple third sub-pixel units are arranged to form one column (for example, an even-numbered column) of sub-pixels alone, and each column of sub-pixels correspond to one data line DL.

The data voltages Vdata, corresponding to the multiple sub-pixel units PX in one column of sub-pixels connected to a first data line DL1, are all provided by the first data line DL1, and at the same time, the second power voltages VSS, corresponding to the multiple sub-pixel units PX in the column of sub-pixels, may also be provided by the first data line DL1. In other words, the first data line DL1 provides the data voltages Vdata and the second power voltages VSS for all sub-pixel units PX in the same column of sub-pixels in a time-sharing manner. Similarly, a second data line DL2 provides data voltages Vdata and second power voltages VSS to all sub-pixel units PX in a second column of sub-pixels in a time-sharing manner, a third data line DL3 provides data voltages Vdata and second power voltages VSS to all sub-pixel units PX in a third column of sub-pixels in a time-sharing manner, . . . , and an n-th data line DLn provides data voltages Vdata and second power voltages VSS to all sub-pixel units PX in an n-th column of sub-pixels in a time-sharing manner. Herein, all sub-pixel units PX in the same column of sub-pixels share the same second power voltage VSS.

Of course, in other embodiments, the second power voltages VSS corresponding to part of the sub-pixel units PX in the same column of sub-pixels may be provided by the second data line DL2, and the second power voltages VSS corresponding to the other part of the sub-pixel units PX may be provided by the first data line DL1. In other words, the first data line DL1 provides the data voltages Vdata for all sub-pixel units PX in the same column of sub-pixels and provides the second power voltages VSS to part of the sub-pixel units PX, and the second power voltages VSS of the other part of the sub-pixel units PX in this column of sub-pixels are provided by the second data line DL2. The second power voltage VSS transmitted on the second data line DL2 may be different from the second power voltage VSS transmitted on the first data line DL1 so that the second power voltages VSS corresponding to different sub-pixel units PX in the same column of sub-pixels can be different from each other, thereby achieving the separate control on the second power voltages VSS of different sub-pixel units PX in the same column of sub-pixels.

It is to be noted that since the second power voltages VSS provided by at least part of different data lines DL are different from each other and the second power voltages VSS are then transmitted to the second electrodes (corresponding to the cathodes of the light-emitting diodes) of the light-emitting devices 130, the cathode layer of the display panel is no longer an entire surface, and each light-emitting device 130 corresponds to one cathode electrode block or one cathode electrode strip, to ensure that the second power voltage VSS of different light-emitting devices 130 do not affected each other.

In the technical schemes provided by the embodiments of the present disclosure, the data line is reused in a time-sharing manner to transmit the data voltage during the data writing stage and transmit the second power voltage during the light emission stage, and the second power voltage of the corresponding data line is transmitted to the second electrode of the light-emitting device during the light emission stage. In the display panel to which the pixel circuit is applied, the second electrode of the light-emitting device and the data line in the display panel can be connected, thereby realizing that at least part of the light-emitting devices in each column are independently powered by the data line, effectively avoiding the light-emitting devices on the whole surface from sharing the same second power voltage. It is conducive to reducing the power consumption of the display, and at the same time it is conducive to reducing the number of wires, thereby facilitating the layout of wires.

It is to be noted that the above embodiment is only one example embodiment of the present disclosure, which is intended to help understand the present scheme and is not a limitation thereon. Which data line DL is used to transmit the second power voltage VSS can be flexibly set according to the arrangement of the sub-pixel units PX.

Figure 3:
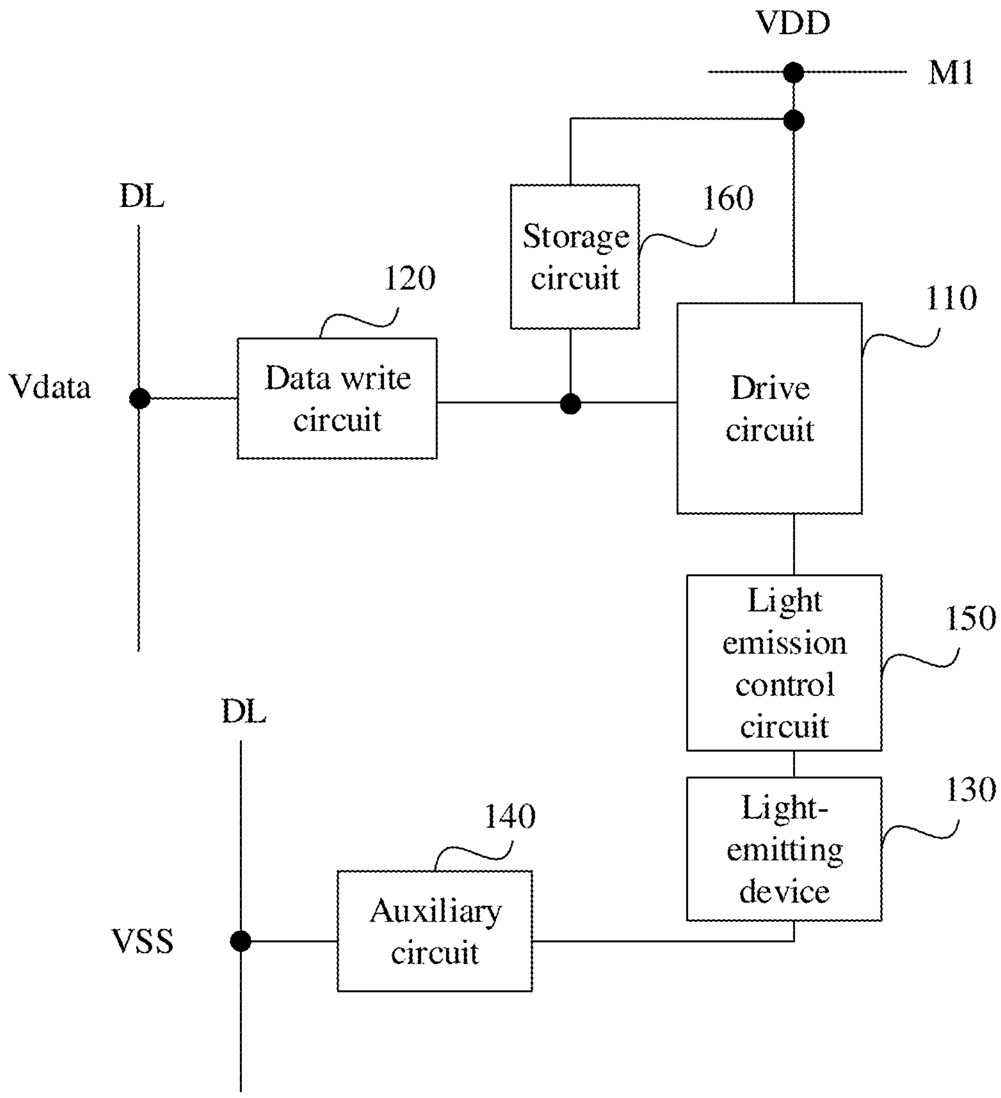
FIG. 3 is a structural diagram of another pixel circuit according to an embodiment of the present disclosure.

FIG. 3 is a structural diagram of another pixel circuit according to an embodiment of the present disclosure. With reference to FIG. 3, on the basis of the technical schemes described above, for example, the pixel circuit provided by this embodiment further includes an auxiliary circuit 140 in a connection path between the light-emitting device 130 and the data line DL. The auxiliary circuit 140 is configured to transmit the second power voltage VSS to the second electrode of the light-emitting device 130 during the light emission stage.

With the pixel circuit shown in FIG. 3 as an example, the working process of the pixel circuit at least includes a data writing stage and a light emission stage.

During the data writing stage, the data write circuit 120 is turned on, the auxiliary circuit 140 and the light emission control circuit 150 are turned off, and the data voltage Vdata is transmitted on the data line DL. The data voltage Vdata on the data line DL is transmitted to the drive circuit 110 through the data write circuit 120, and the storage circuit 160 stores the voltage of the control terminal of the drive circuit 110.

During the light emission stage, the auxiliary circuit 140 and the light emission control circuit 150 are turned on, the data write circuit 120 is turned off, and the second power voltage VSS is transmitted on the data line DL. The second power voltage VSS on the data line DL is transmitted to the second electrode of the light-emitting device 130 through the auxiliary circuit 140, and the drive circuit 110 drives the light-emitting device 130 to emit light according to the voltage of the control terminal of the drive circuit 110.

When the pixel circuit is applied to the display panel shown in FIG. 2, during the light emission stage, the second power voltage VSS transmitted on the first data line DL1 may be different from the second power voltage VSS transmitted on the second data line DL2, and the second power voltage VSS transmitted on the first data line DL1 may also be different from the second power voltage VSS transmitted on the third data line DL3, thereby achieving the separate control on the second power voltages VSS corresponding to the second electrodes of the light-emitting devices 130 in different columns.

Figure 4:
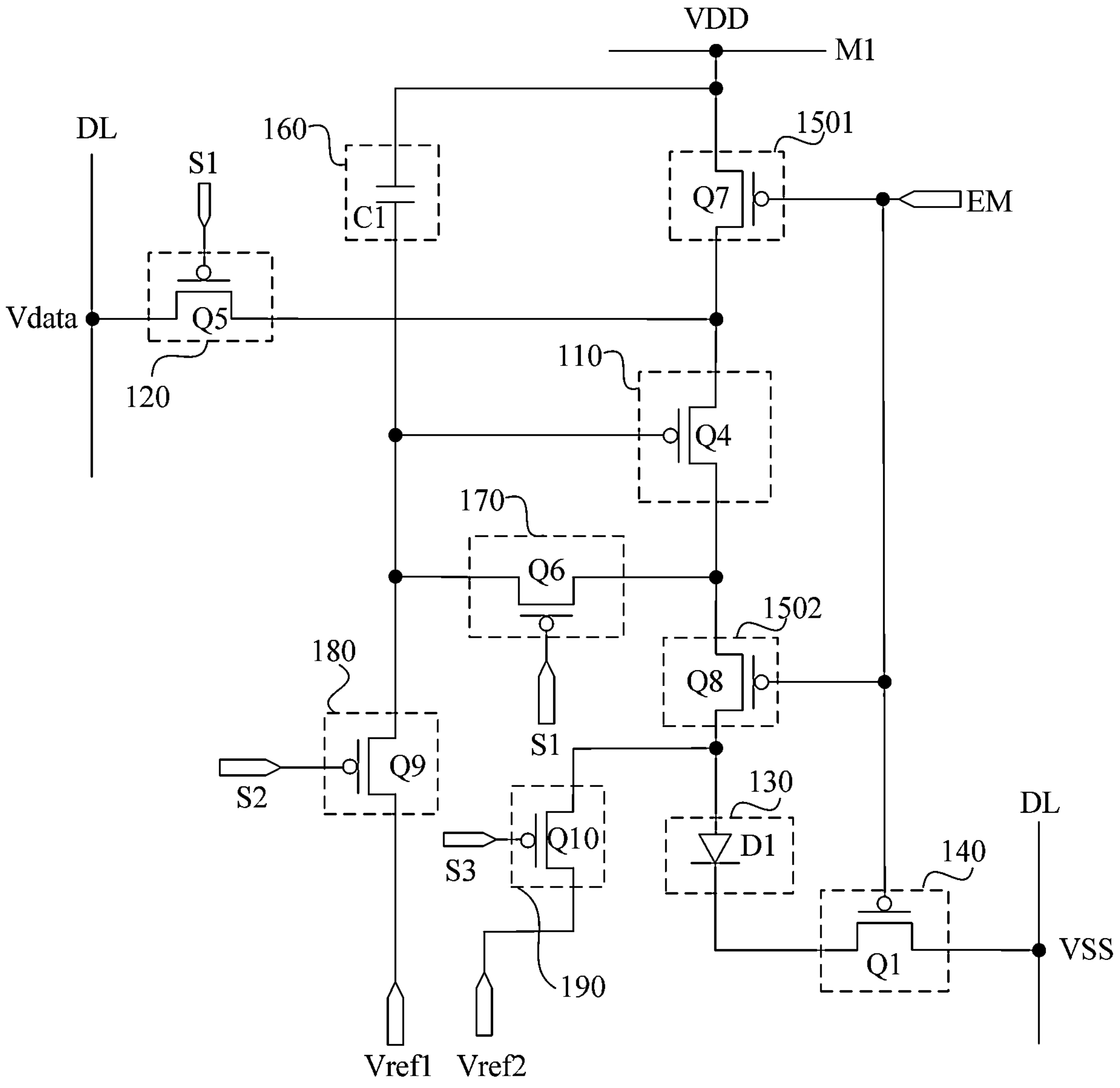
FIG. 4 is a structural diagram of another pixel circuit according to an embodiment of the present disclosure.

FIG. 4 is a structural diagram of another pixel circuit according to an embodiment of the present disclosure. With reference to FIG. 4, on the basis of the technical schemes described above, for example, the pixel circuit further includes a first light emission control circuit 1501 and a second light emission control circuit 1502. The first light emission control circuit 1501 is connected between the power line M1 and a first terminal of the drive circuit 110, the second light emission control circuit 1502 is connected between a second terminal of the drive circuit 110 and the first electrode of the light-emitting device 130, a control terminal of the first light emission control circuit 1501 and a control terminal of the second light emission control circuit 1502 are connected to a light emission control signal line separately, and the light emission control signal line is configured to transmit a light emission control signal EM.

For example, the pixel circuit further includes a compensation circuit 170 and a storage circuit 160. The storage circuit 160 is connected between the control terminal of the drive circuit 110 and the power line M1, the compensation circuit 160 is connected between the control terminal of the drive circuit 110 and the second terminal of the drive circuit 110, and the compensation circuit 160 is configured to compensate for a threshold voltage of the drive circuit 110 during the data writing stage.

For example, the pixel circuit further includes a first initialization circuit 180 and a second initialization circuit 190. The first initialization circuit 180 is connected between a first initialization signal line and the control terminal of the drive circuit 110 and is configured to transmit a first initialization voltage Vref1 on the first initialization signal line to the control terminal of the drive circuit 110 during an initialization stage. The second initialization circuit 190 is connected between a second initialization signal line and the first electrode of the light-emitting device 130 and is configured to transmit a second initialization voltage Vref2 on the second initialization signal line to the first electrode of the light-emitting device 130. The first initialization signal line may also be reused as the second initialization signal line.

In an embodiment, a control terminal of the auxiliary circuit 140 may be connected to the light emission control signal line, thereby reducing the number of signal lines. For example, the auxiliary circuit 140 includes a first transistor Q1. A gate electrode of the first transistor Q1 is connected to the light emission control signal line, a first electrode of the first transistor Q1 is connected to the second electrode of the light-emitting device 130, and a second electrode of the first transistor Q1 is connected to a corresponding data line DL. The light-emitting device 130 includes a light-emitting diode D1, and the light-emitting diode D1 may be a light-emitting diode (LED), a Micro LED, an OLED, or the like.

Further, the drive circuit 110 includes a fourth transistor Q4, the data write circuit 120 includes a fifth transistor Q5, the compensation circuit 170 includes a sixth transistor Q6, the first light emission control circuit 1501 includes a seventh transistor Q7, the second light emission control circuit 1502 includes an eighth transistor Q8, the first initialization circuit 180 includes a ninth transistor Q9, and the second initialization circuit 190 includes a tenth transistor Q10. A first electrode of the fifth transistor Q5 is connected to the data line DL, a second electrode of the fifth transistor Q5 is connected to a first electrode of the fourth transistor Q4, and a gate electrode of the fifth transistor Q5 is connected to a first scan line to respond to a first scan signal S1 outputted from the first scan line. A first electrode of the sixth transistor Q6 is connected to a second electrode of the fourth transistor Q4, a second electrode of the sixth transistor Q6 is connected to a gate electrode of the fourth transistor Q4, and a gate electrode of the sixth transistor Q6 is connected to the first scan line. The seventh transistor Q7 is connected between the power line M1 and the first electrode of the fourth transistor Q4, the eighth transistor Q8 is connected between the second electrode of the fourth transistor Q4 and the anode of the light-emitting diode D1, the cathode of the light-emitting diode D1 is connected to the first electrode of the first transistor Q1, and both a gate electrode of the seventh transistor Q7 and a gate electrode of the eighth transistor Q8 are connected to the light emission control signal line. A first electrode of the ninth transistor Q9 is connected to the first initialization signal line, a second electrode of the ninth transistor Q9 is connected to the gate electrode of the fourth transistor Q4, and a gate electrode of the ninth transistor Q9 is connected to a second scan line to respond to a second scan signal S2 outputted from the second scan line. A first electrode of the tenth transistor Q10 is connected to the second initialization signal line, a second electrode of the tenth transistor Q10 is connected to the anode of the light-emitting diode D1, and a gate electrode of the tenth transistor Q10 is connected to a third scan line to respond to a third scan signal S3 outputted from the third scan line. The specific working process of the pixel circuit will not be repeated herein.

For example, the storage circuit 160 includes a first capacitor C1.

For example, in another implementation provided by this embodiment, the pixel circuit provided by this embodiment includes a drive circuit 110, a data write circuit 120, a light-emitting device 130, and an auxiliary circuit 140. The data write circuit 120 is configured to transmit the data voltage Vdata to the drive circuit 110 during the data writing stage so that a voltage related to the data voltage Vdata is written to the control terminal of the drive circuit 110. The drive circuit 110 is connected between the power line M1 and the first electrode of the light-emitting device 130. The second electrode of the light-emitting device 130 is connected to the auxiliary circuit 140. The auxiliary circuit 140 is configured to transmit the second power voltage VSS to the second electrode of the light-emitting device 130 during the light emission stage. The drive circuit 110 is configured to drive the light-emitting device 130 to emit light according to the voltage of the control terminal of the drive circuit 110. Herein, the second power voltage VSS may be provided by a corresponding data line DL or may be provided by another signal line, as long as the cathode voltages of different light-emitting devices 130 can be separately controlled.

For example, the embodiments of the present disclosure further provide a display panel. The display panel includes the pixel circuit provided by any embodiment described above. As shown in FIGS. 1 and 2, the display panel includes sub-pixel units PX arranged in an array. Each sub-pixel unit PX includes a pixel circuit and a light-emitting device 130, and the light-emitting device 130 is correspondingly connected to the pixel circuit.

The display panel further includes multiple data lines DL. The data lines DL extend in a first direction Y and are arranged in a second direction X, the first direction Y and the second direction X intersect each other, and each data line DL is connected to the data write circuits 120 of the pixel circuits in the same column.

In this embodiment, different data lines DL correspond to the data write circuits 120 of the pixel circuits in different columns, respectively. For example, the first data line DL1 is a data line DL corresponding to multiple pixel circuits in the first column, the second data line DL2 may be a data line DL corresponding to multiple pixel circuits in the second column, the third data line DL3 is a data line DL corresponding to multiple pixel circuits in the third column, . . . , and so on.

The data line DL is configured to transmit the data voltage Vdata and the second power voltage VSS in a time-sharing manner. For example, all the data write circuits 120 of the multiple pixel circuits in the first column are connected to the first data line DL1, and all the data write circuits 120 of the multiple pixel circuits in the second column are connected to the second data line DL2. During the data writing stage, the first data line DL1 transmits the data voltage Vdata to the data write circuits 120 of the multiple pixel circuits in the first column of pixels, and the second data line DL2 transmits the data voltage Vdata to the data write circuits 120 of the multiple pixel circuits in the second column of pixels. During the light emission stage, the first data line DL1 transmits the second power voltage VSS to the second electrodes of the light-emitting devices 130 of the multiple pixel circuits in the first column of pixels, and the second data line DL2 transmits the second power voltage VSS to the second electrodes of the light-emitting devices 130 of the multiple pixel circuits in the second column of pixels. Alternatively, during the light emission stage, the first data line DL1 transmits the second power voltage VSS to the second electrodes of the light-emitting devices 130 of part of the pixel circuits in the first column of pixels, and the second data line DL2 transmits the second power voltage VSS to the second electrodes of the light-emitting devices 130 of the other part of the pixel circuits in the first column of pixels. The connection relationship between multiple pixels and the data lines DL corresponding to the multiple pixels will be specifically described in the subsequent embodiments.

In the technical schemes provided by the embodiments of the present disclosure, the data line is reused in a time-sharing manner to transmit the data voltage during the data writing stage and transmit the second power voltage during the light emission stage, and the second power voltage of the corresponding data line is transmitted to the second electrode of the light-emitting device during the light emission stage. In the display panel to which the pixel circuit is applied, the second electrodes of the light-emitting devices in each column and each data line in the display panel can be connected, thereby realizing that at least part of the light-emitting devices in each column are independently powered by the data line, effectively avoiding the light-emitting devices on the whole surface from sharing the same second power voltage. It is conducive to reducing the power consumption of the display, and at the same time it is conducive to reducing the number of wires, thereby facilitating the layout of wires.

Figure 5:
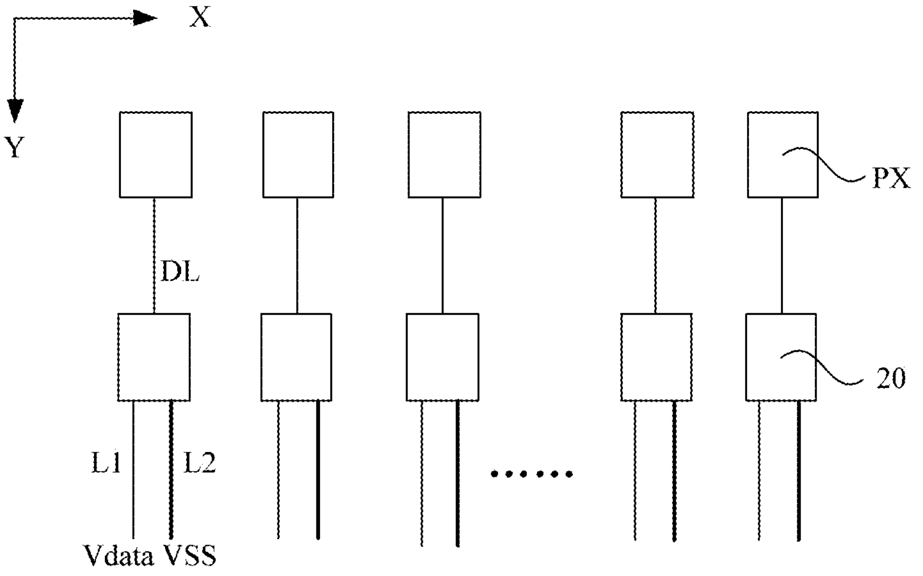
FIG. 5 is a structural diagram of another display panel according to an embodiment of the present disclosure.

FIG. 5 is a structural diagram of another display panel according to an embodiment of the present disclosure. With reference to FIG. 5, on the basis of the technical schemes described above, the display panel further includes multiple signal selection circuits 20. Each data line DL is correspondingly connected to one signal selection circuit 20. The signal selection circuit 20 is configured to transmit the data voltage Vdata and the second power voltage VSS to the corresponding data line DL in a time-sharing manner.

For example, input terminals of a signal selection circuit 20 are connected to a first connection line L1 and a second connection line L2, respectively, an output terminal of the signal selection circuit 20 is connected to a corresponding data line DL, and the first connection line L1 and the second connection line L2 are each configured to connect to a driver chip to enable the driver chip to send the data voltage Vdata or the second power voltage VSS to the corresponding data line DL. The signal selection circuit 20 is configured to be on in a time-sharing manner. For example, the signal selection circuit 20 enables the first connection line L1 to be connected to the data line DL during the data writing stage to transmit the data voltage Vdata on the first connection line L1 to the corresponding data line DL, and the data voltage Vdata sequentially charges each row of pixels through the data line DL. After charging is completed in all rows, the light emission stage starts. The signal selection circuit 20 enables the second connection line L2 to be connected to the data line DL to transmit the second power voltage VSS on the second connection line L2 to the corresponding data line DL, and the second voltage VSS supplies power to the second electrode of the light-emitting device 130 through the data line DL to complete light emission.

Figure 6:
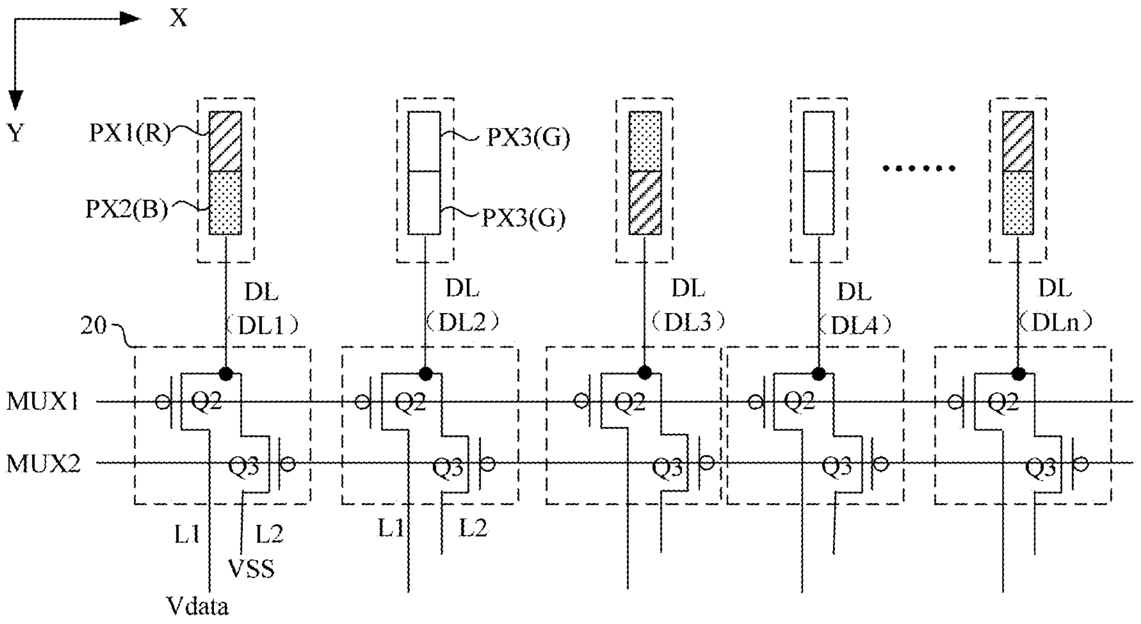
FIG. 6 is a structural diagram of another display panel according to an embodiment of the present disclosure.

FIG. 6 is a structural diagram of another display panel according to an embodiment of the present disclosure. Only some pixels, the corresponding data lines DL, and the corresponding signal selection circuits 20 are shown in FIG. 6. With reference to FIG. 6, for example, multiple sub-pixel units PX in the display panel include a first sub-pixel unit PX1, a second sub-pixel unit PX2, and a third sub-pixel unit PX3. The first sub-pixel unit PX1, the second sub-pixel unit PX2, and the third sub-pixel unit PX3 have different emitted colors. For example, the first sub-pixel unit PX1 includes a red sub-pixel R, the second sub-pixel unit PX2 includes a blue sub-pixel B, and the third sub-pixel unit PX3 includes a green sub-pixel G.

In this embodiment, the multiple sub-pixel units PX may be arranged as follows: red sub-pixels R and blue sub-pixels B are arranged alternately in the first column, multiple green sub-pixels G are arranged sequentially in the second column, blue sub-pixels B and red sub-pixels R are arranged alternately in the third column, multiple green sub-pixels G are arranged sequentially in the fourth column, and the arrangement of the first column to the fourth column is subsequently repeated orderly. In other words, the pixels in the odd-numbered column are arranged with red sub-pixels R and blue sub-pixels arranged alternately, and the pixels in the even-numbered column are arranged with multiple green sub-pixels arranged sequentially. Certainly, in other embodiments, there may be another arrangement manner. This embodiment only shows one of the arrangement manners and is not a limitation thereon.

With reference to FIG. 6, the signal selection circuit 20 includes a second transistor Q2 and a third transistor Q3. A first electrode of the second transistor Q2 is configured to access the data voltage Vdata, a second electrode of the second transistor Q2 is connected to the data line DL, and a gate electrode of the second transistor Q2 is connected to a first switch control signal line. A first electrode of the third transistor Q3 is configured to access the second power voltage VSS, a second electrode of the third transistor Q3 is connected to the data line DL, and a gate electrode of the third transistor Q3 is connected to a second switch control signal line. The second transistor Q2 and the third transistor Q3 in the same signal selection circuit 20 are connected to the same data line DL, and the original wiring manner does not need to be changed, thereby facilitating the reduction of process difficulty.

Figure 7:
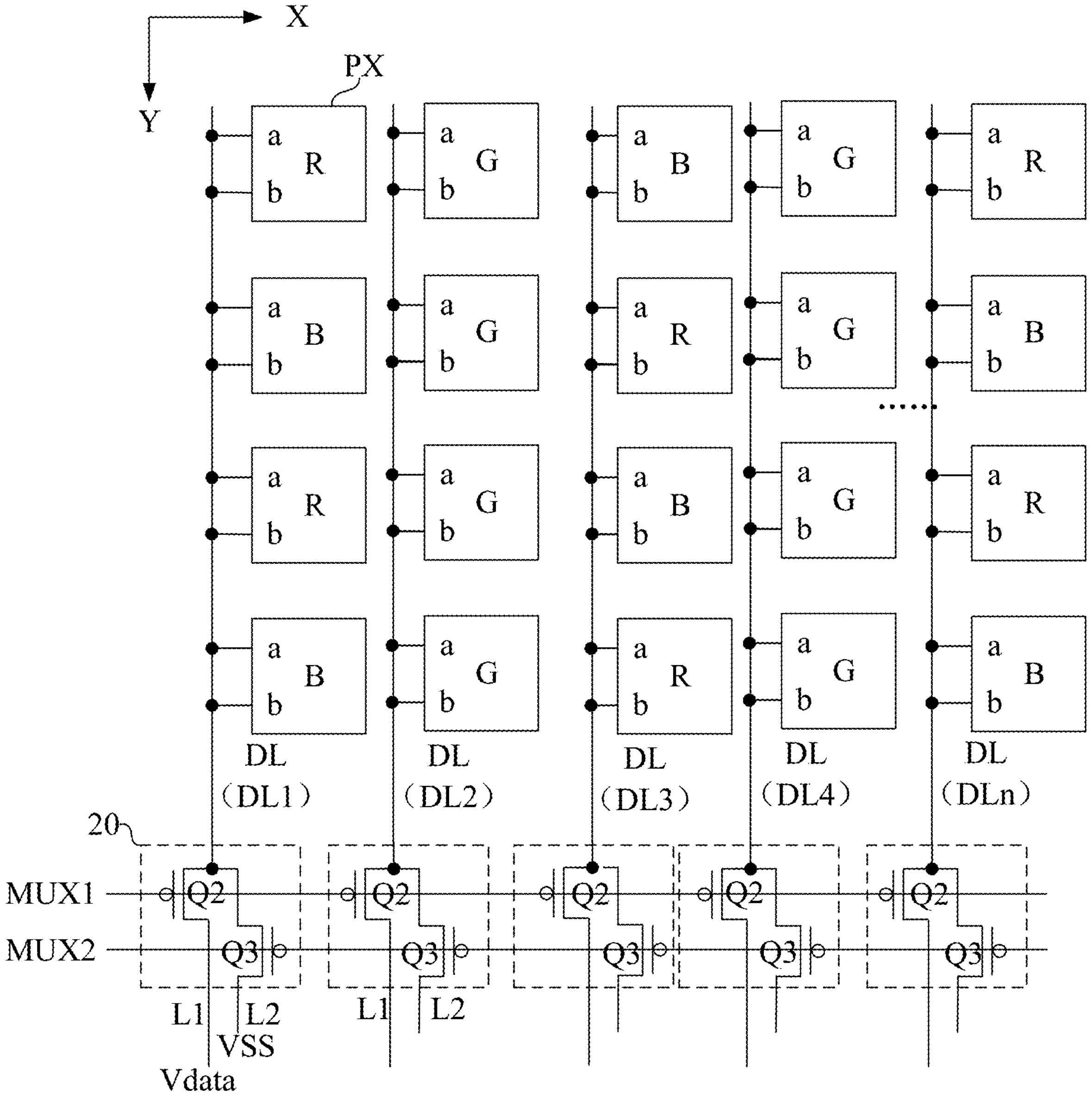
FIG. 7 is a structural diagram of another display panel according to an embodiment of the present disclosure.

FIG. 7 is a structural diagram of another display panel according to an embodiment of the present disclosure. The structure of the display panel shown in FIG. 7 shows the connection relationship between multiple sub-pixel units PX and the data lines DL in the display panel on the basis of FIG. 6. With reference to FIG. 7, both the terminal a and the terminal b of each of the multiple sub-pixel units PX in the first column are connected to the first data line DL1, both the terminal a and the terminal b of each of the multiple sub-pixel units PX in the second column are connected to the second data line DL2, . . . , and both the terminal a and the terminal b of each of the multiple sub-pixel units PX in the n-th column are connected to the n-th data line DLn. The terminal a is a terminal of the data write circuit 120 connected to the data line DL, and the terminal b is a terminal of the auxiliary circuit 140 connected to the data line DL, that is, the data line DL connected to the second electrode of the light-emitting device 130 and the data line DL connected to the data write circuit 120 are the same data line DL.

Figure 8:
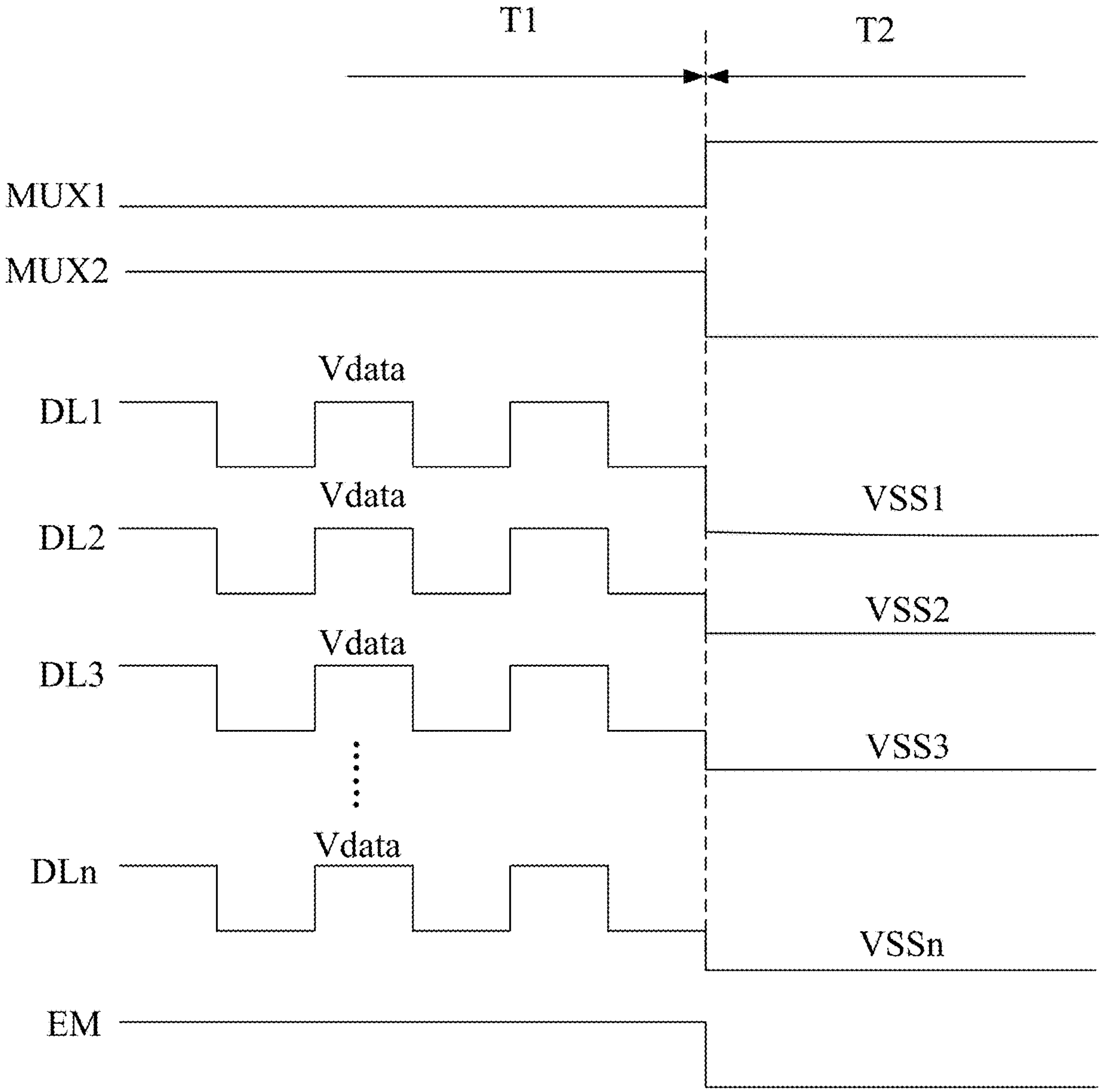
FIG. 8 is a drive timing waveform diagram of a display panel according to an embodiment of the present disclosure.

In this embodiment, a first switch control signal MUX1 on the first switch control signal line is configured to transmit an effective level signal during the data writing stage and transmit an ineffective level signal during the light emission stage, and a second switch control signal MUX2 on the second switch control signal line is configured to transmit an ineffective level signal during the data writing stage and transmit an effective level signal during the light emission stage. FIG. 8 is a drive timing waveform diagram of a display panel according to an embodiment of the present disclosure. The drive timing can be used for driving the display panel shown in FIG. 7 and will be described in conjunction with FIGS. 4 to 8 and using an example where multiple transistors are all P-type transistors.

During the data writing stage T1, the first switch control signal MUX1 is low, the second switch control signal MUX2 is high, and the light emission control signal EM is high. The second transistor Q2 is on, the data voltage Vdata on the first connection line L1 is transmitted to the corresponding data line DL to charge the data line DL, and the data voltage Vdata is written to multiple rows of pixel circuits row by row through the data line DL. After the data writing on the pixel circuits in all rows is completed, the data writing stage T1 ends. In other words, in this embodiment, the data writing of each pixel row is performed within a sub-stage, the data writing stage T1 includes the sub-stages of data writing of all pixel rows in the display panel, and when the data writing of all pixel rows is completed, all pixel rows in the entire display panel enter the light emission stage T2.

During the light emission stage T2, the first switch control signal MUX1 is high, the second switch control signal MUX2 is low, and the light emission control signal EM is low. Therefore, the third transistor Q3, the first transistor Q1, the seventh transistor Q7, and the eighth transistor Q8 are on, the second power voltage VSS on the second connection line L2 is transmitted to the corresponding data line DL through the turn-on third transistor Q3, the data line DL then transmits the second power voltage VSS to the second electrode (that is, the cathode of the light-emitting diode D1) of the light-emitting device 130 through the turn-on first transistor Q1, and the drive circuit 110 generates a drive current to drive the light-emitting device 130 to emit light. The second power voltage transmitted on the first data line DL1 is VSS1, the second power voltage transmitted on the second data line DL2 is VSS2, the second power voltage transmitted on the third data line DL3 is VSS3, . . . , and the second power voltage transmitted on the n-th data line DLn is VSSn, where VSS1 is different from VSS2, and VSS1 may be the same as or different from VSS3, which may be set according to actual requirements.

In the technical scheme provided by this embodiment of the present disclosure, by setting the signal selection circuit to transmit the data voltage and the second power voltage to the corresponding data line in a time-sharing manner, a conflict between the data voltage and the second power voltage in the charging process as well as the resulting undesirable effects can effectively be avoided, thereby facilitating the separate control on the cathode voltages of sub-pixels in multiple columns. The second power voltage VSS corresponding to the multiple sub-pixels in the same column of pixels is provided by the data line DL that provides the data voltage Vdata for the pixels in this column. By reusing the data line DL, during the light emission stage, the second power voltage VSS is transmitted to the corresponding column of pixel units through the corresponding data line DL. The red sub-pixels R and the blue sub-pixels B share one second power voltage VSS, the green sub-pixels G uses one second power voltage VSS alone, and the two second power voltages VSS are different from each other, thereby achieving the separate control on the cathode voltages of the green sub-pixels G and facilitating the reduction of power consumption.

For example, the display panel provided by this embodiment further includes multiple cathode electrode blocks. The second electrode of the light-emitting device 130 in one pixel circuit is one cathode electrode block, and the cathode electrode block is configured to receive the second power voltage VSS. In a case in which the second electrode of the light-emitting device 130 and the data write circuit 120 are connected to the same data line DL, the cathode electrode blocks of the light-emitting devices 130 in the same column are connected together to form a cathode electrode strip, and the cathode electrode strip is connected in a one-to-one correspondence with a corresponding data line DL. In other words, multiple cathode electrode blocks in the same column are connected together to form one cathode electrode strip, thereby reducing the cathode wire and facilitating the layout of wires.

In a case in which the second electrode of the light-emitting device 130 and the data write circuit 120 are connected to different data lines DL, the second electrodes of some light-emitting devices 130 among the light-emitting devices 130 that emit light of the same color are connected together to form a cathode electrode strip (or the second electrodes of some light-emitting devices 130 among the light-emitting devices 130 are connected together through the auxiliary circuit 140), and the cathode electrode strip is connected to a corresponding data line DL. Alternatively, the second electrodes of the multiple light-emitting devices 130 still each exist in the form of an independent cathode electrode block, and the second electrodes of some light-emitting devices 130 among the light-emitting devices 130 that emit light of the same color are connected to the same data line DL (or through the auxiliary circuit 140), which can also achieve the independent control on the cathode voltages of some light-emitting devices 130 among the light-emitting devices 130 that have the same emitted color.

Figure 9:
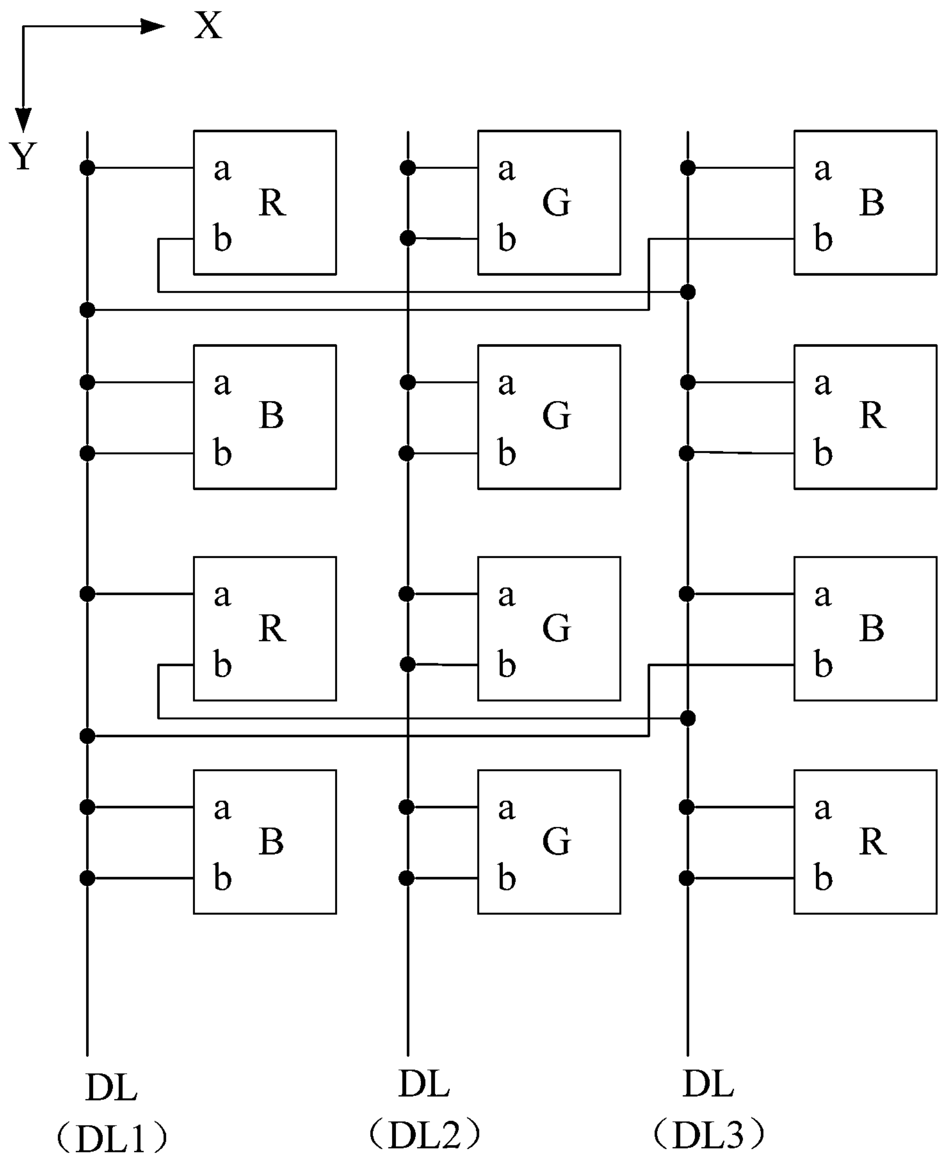
FIG. 9 is a structural diagram of another display panel according to an embodiment of the present disclosure.
Figure 10:
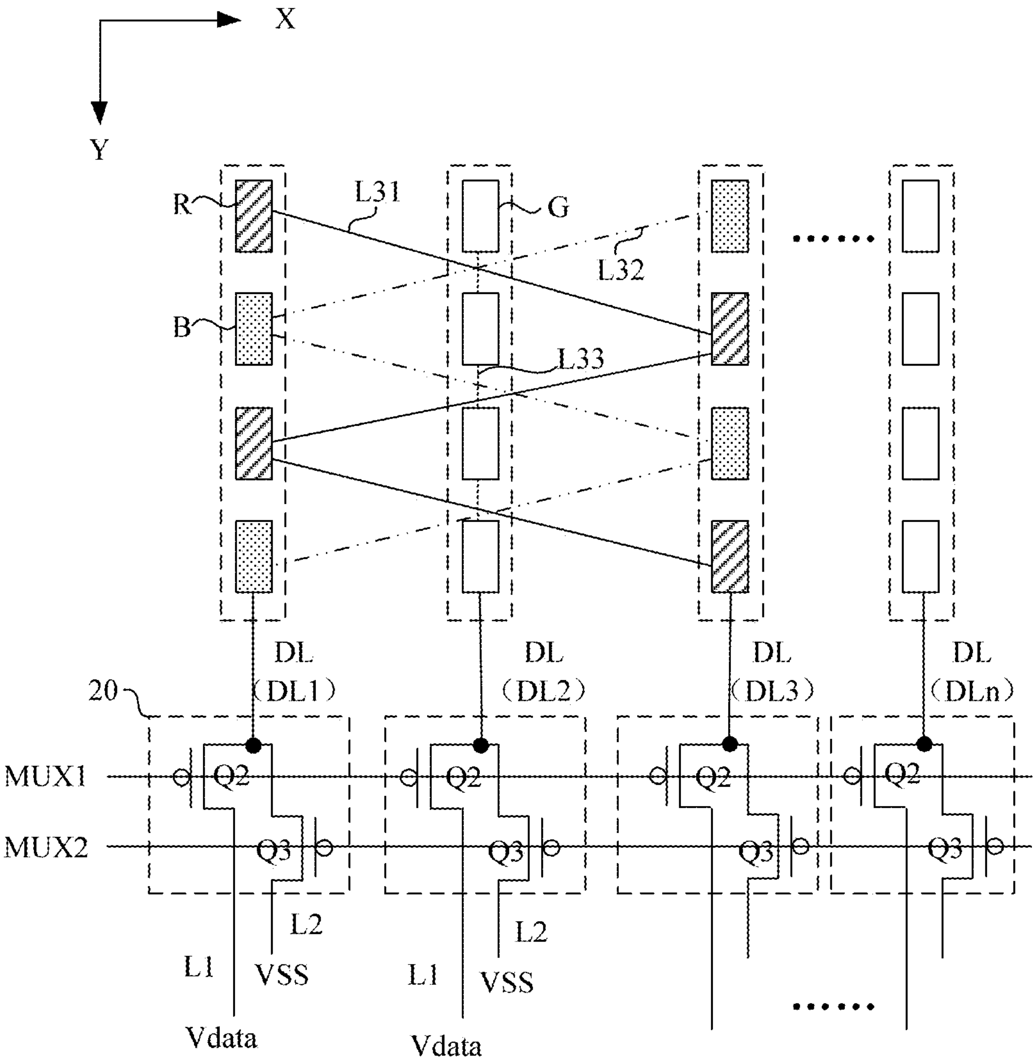
FIG. 10 is a structural diagram of another display panel according to an embodiment of the present disclosure.

FIG. 9 is a structural diagram of another display panel according to an embodiment of the present disclosure, and FIG. 10 is a structural diagram of another display panel according to an embodiment of the present disclosure. With reference to FIGS. 9 and 10, the data line DL connected to the second electrode of the light-emitting device 130 is different from the data line DL connected to the data write circuit 120. The connection relationship between the pixel circuits corresponding to sub-pixels of multiple emitted colors and the data lines DL is illustratively shown in FIGS. 9 and 10. The display panel further includes a wire. In the light-emitting devices 130 (pixels) in the same column, the cathode electrode blocks of the light-emitting devices 130 of the same emitted color are connected together through the wire to form one cathode electrode strip, and each cathode electrode strip corresponds to one data line DL; or the cathode electrode blocks of the light-emitting devices 130 of the same emitted color in the same column are connected to the cathode electrode blocks of the light-emitting devices 130 of the same emitted color in a different column through the wire to form one cathode electrode strip. It is to be noted that the connection relationship of the pixel circuit herein needs to be changed, for example, for auxiliary circuits 140 corresponding to the same emitted color in different columns, an auxiliary circuit 140 is connected to a data line DL, and the data line DL is different from the data line DL connected to a data write circuit 120 corresponding to a light-emitting device 130 of the auxiliary circuit 140.

On the basis of the technical schemes described above, for example, with reference to FIG. 9, the terminal a is a terminal of the data write circuit 120 connected to the data line DL, and the terminal b is a terminal of the auxiliary circuit 140 connected to the data line DL. The data write circuits 120 of the pixel circuits corresponding to all the sub-pixels in the first column of pixels are all connected to the first data line DL1, the data write circuits 120 of the pixel circuits corresponding to all the sub-pixels in the second column of pixels are all connected to the second data line DL2, the data write circuits 120 of the pixel circuits corresponding to all the sub-pixels in the third column of pixels are all connected to the third data line DL3, . . . , and subsequent multiple data lines DL repeat the above connection relationship of multiple columns of sub-pixels in groups of three. The auxiliary circuits 140 of the pixel circuits corresponding to the red sub-pixels R in the first column of pixels are all connected to the third data line DL3, the auxiliary circuits 140 of the pixel circuits corresponding to the blue sub-pixels B in the third column of pixels are all connected to the first data line DL1, and the auxiliary circuits 140 of the pixel circuits corresponding to the green sub-pixels G in the second column of pixels are all connected to the second data line DL2. In other words, by changing the connection relationship between the cathodes (the second electrodes of the light-emitting devices 130) of different columns of sub-pixels and the data lines DL, the second power voltages VSS of the sub-pixels of the same emitted color in each column of pixels are provided by the same data line DL, thereby achieving the separate control on the second power voltages VSS corresponding to sub-pixels of different emitted colors.

For example, with the connection structure shown in FIG. 10 as an example, the blue sub-pixels B in the first column of pixels and the blue sub-pixels B in the third column of pixels are sequentially connected through the second wire L32 so that the cathode electrode blocks of all the blue sub-pixels B in the first and third columns of pixels are connected together to form a cathode electrode strip. The red sub-pixels R in the first column of pixels and the red sub-pixels R in the third column of pixels are sequentially connected through the first wire L31 so that the cathode electrode blocks of all the red sub-pixels R in the first and third columns of pixels are connected together to form a cathode electrode strip. All the pixels in the second column are green sub-pixels G, and the cathode electrode blocks of the multiple green sub-pixels G are connected together through the third wire L33 to form a cathode electrode strip.

In conjunction with the drive timing shown in FIG. 8 and the pixel circuit shown in FIG. 4, during the data writing stage T1, the first switch control signal MUX1 is low, the second switch control signal MUX2 is high, and the light emission control signal EM is high. The second transistor Q2 is on, and the data voltage Vdata on the first connection line L1 is transmitted to the corresponding data line DL to charge the data line DL. The data write circuits 120 in the pixel circuits corresponding to all the sub-pixels in each column of pixels are all connected to the same data line DL, and the data voltage Vdata is written to multiple rows of pixel circuits row by row through the data line DL. After the data writing on the pixel circuits in all rows is completed, the data writing stage T1 ends.

During the light emission stage T2, the first switch control signal MUX1 is high, the second switch control signal MUX2 is low, and the light emission control signal EM is low. Therefore, the third transistor Q3, the first transistor Q1, the seventh transistor Q7, and the eighth transistor Q8 are on, and the second power voltage VSS on the second connection line L2 is transmitted to the corresponding data line DL through the turn-on third transistor Q3. The second power voltages VSS transmitted on the first data line DL1, the second data line DL2, and the third data line DL3 respectively are different, that is, VSS1, VSS2, and VSS3 are different from each other. Therefore, the second power voltages VSS corresponding to the multiple blue sub-pixels B in the first column of pixels and the second power voltages VSS corresponding to the multiple blue sub-pixels B in the third column of pixels are all provided by the first data line DL1 connected to the first column of pixels; the second power voltages VSS corresponding to the multiple red sub-pixels R in the first column of pixels and the second power voltages VSS corresponding to the multiple red sub-pixels R in the third column of pixels are all provided by the third data line DL3 connected to the third column of pixels; the second power voltages VSS corresponding to the green sub-pixels G in the second column of pixels are all provided by the second data line DL2. In this manner, each data line DL provides the second power voltages VSS for the sub-pixels of the same emitted color. Therefore, the separate control on the cathode voltages of RGB sub-pixels can be achieved, and the sub-pixels of each emitted color are powered by a separate second power voltage VSS, thereby facilitating the reduction of power consumption.

On this basis of the above, by adjusting the voltage values of the second power voltages VSS on the multiple data lines DL, the cathode voltages corresponding to sub-pixels of different colors can flexibly be adjusted, thereby improving the edge display effect of the display panel or improving chroma uniformity of the display panel.

For example, in this embodiment, since the light emission stage starts after the data writing stage of the pixels in all rows ends, the first connection line L1 may also be reused as the second connection line L2, thereby reducing the number of connection lines.

Figure 11:
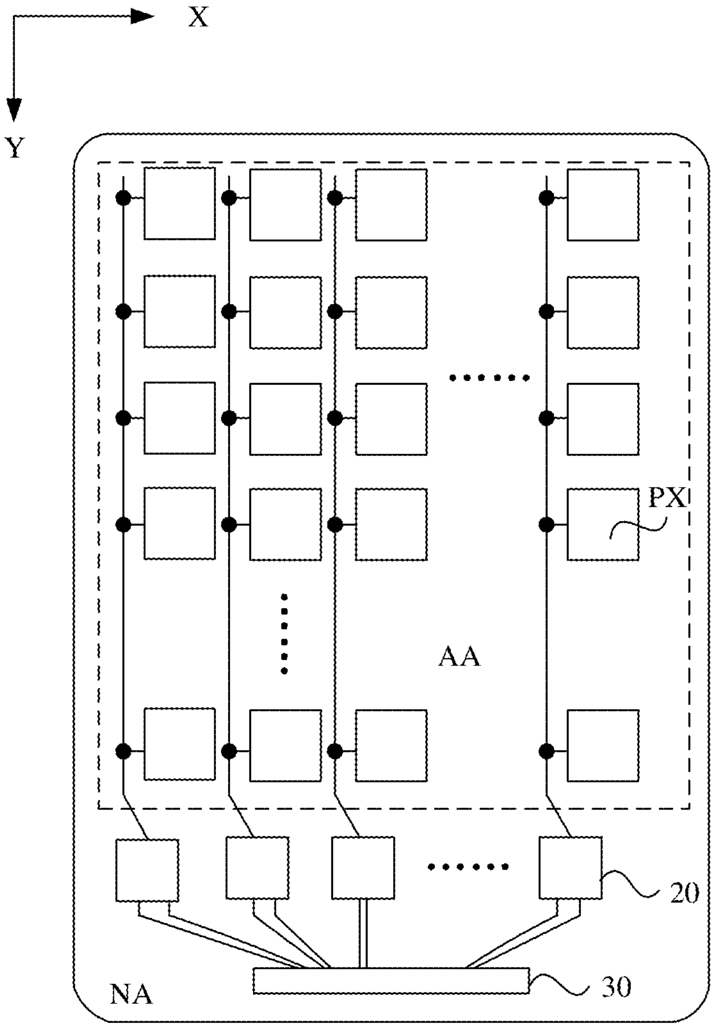
FIG. 11 is a structural diagram of another display panel according to an embodiment of the present disclosure.

FIG. 11 is a structural diagram of another display panel according to an embodiment of the present disclosure. With reference to FIG. 11, the display panel includes a display region AA and a non-display region NA disposed around the display region AA. The pixel circuits are located in the display region AA, and the signal selection circuits 20 are located in the non-display region NA. A driver chip 30 is further disposed in the non-display region NA. The driver chip 30 is connected to multiple signal selection circuits 20 and is configured to provide the data voltage Vdata and the second power voltage VSS for the display panel.

Figure 12:
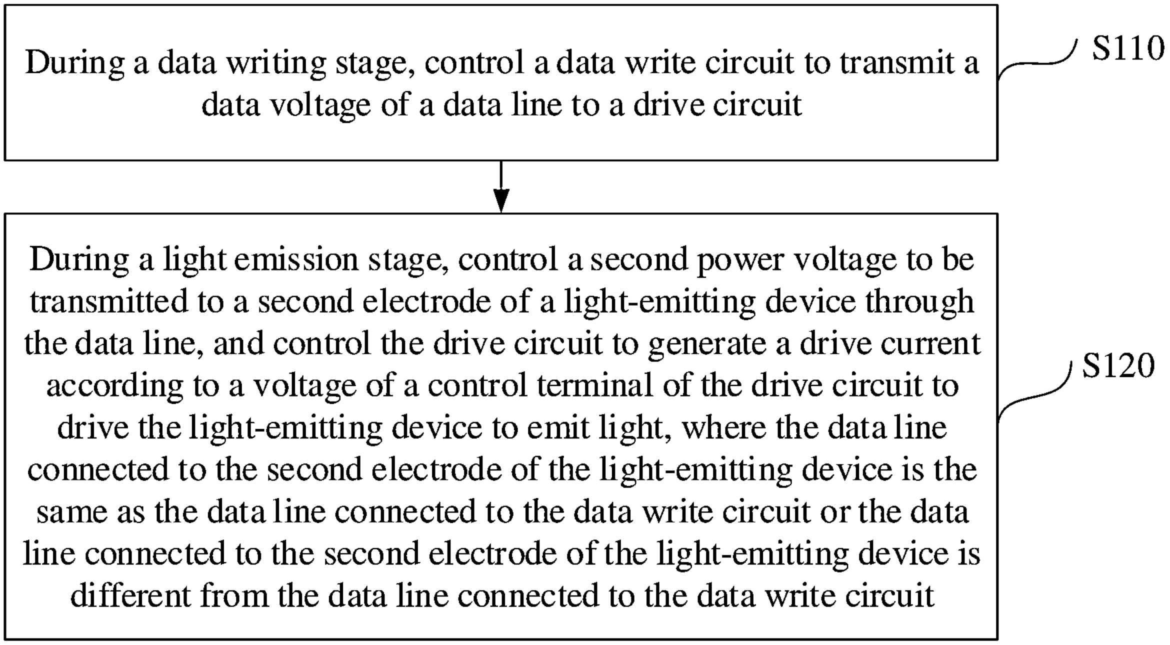
FIG. 12 is a flowchart of a driving method of a pixel circuit according to an embodiment of the present disclosure.

For example, the embodiments of the present disclosure further provide a driving method of a pixel circuit to drive the display panel provided by any embodiment of the present disclosure. FIG. 12 is a flowchart of a driving method of a pixel circuit according to an embodiment of the present disclosure. With reference to FIG. 12, the driving method includes steps S110 and S120.

In S110, during a data writing stage, the data write circuit is controlled to transmit a data voltage of the data line to the drive circuit.

In S120, during a light emission stage, a second power voltage is controlled to be transmitted to the second electrode of the light-emitting device through the data line, and the drive circuit is controlled to generate a drive current according to a voltage of a control terminal of the drive circuit to drive the light-emitting device to emit light. The data line connected to the second electrode of the light-emitting device is the same as the data line connected to the data write circuit or the data line connected to the second electrode of the light-emitting device is different from the data line connected to the data write circuit.

In the display panel, the data voltage Vdata is written to corresponding pixel circuits row by row. In this embodiment, after the data writing on the pixel circuits in all rows is completed, the multiple pixel circuits enter the light emission stage. The second power voltage VSS is transmitted to the second electrode of the light-emitting device through the turn-on auxiliary circuit, and the light-emitting device emits light. For the specific working process of the pixel circuit, reference may be made to the related description in the preceding embodiments, and the details are not repeated herein.

In the technical schemes provided by the embodiments of the present disclosure, the data line is reused in a time-sharing manner to transmit the data voltage during the data writing stage and transmit the second power voltage during the light emission stage, and the second power voltage of the corresponding data line is transmitted to the second electrode of the light-emitting device during the light emission stage. In the display panel to which the pixel circuit is applied, the second electrode of the light-emitting device and the data line in the display panel can be connected, thereby realizing that at least part of the light-emitting devices in each column are independently powered by the data line, effectively avoiding the light-emitting devices on the whole surface from sharing the same second power voltage. It is conducive to reducing the power consumption of the display, and at the same time it is conducive to reducing the number of wires, thereby facilitating the layout of wires.

Figure 13:
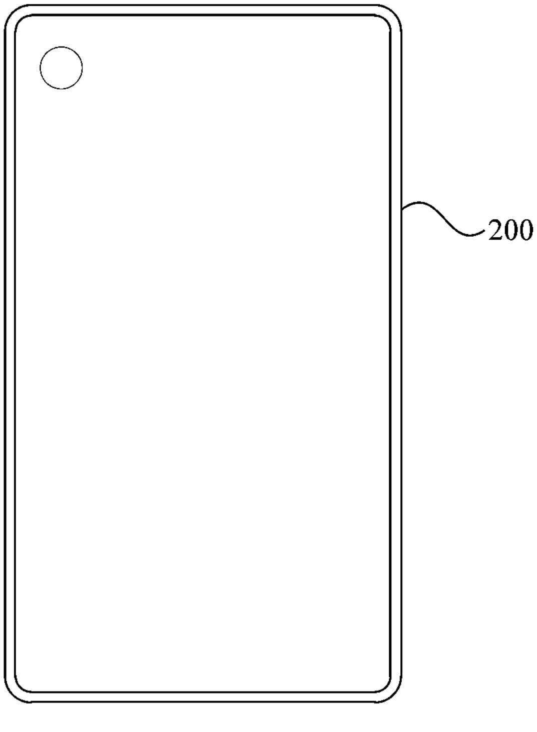
FIG. 13 is a structural diagram of a display device according to an embodiment of the present disclosure.

For example, the embodiments of the present disclosure further provide a display device. The display device includes the display panel provided by any embodiment described above. Therefore, the display device has beneficial effects in any embodiment described above. FIG. 13 is a structural diagram of a display device according to an embodiment of the present disclosure. In this embodiment, the display device 200 may be a mobile phone shown in FIG. 13 or may be any electronic product having a display function, including, but not limited to, a television, a laptop, a desktop display, a tablet computer, a digital camera, a smart bracelet, smart glasses, a vehicle-mounted display, a medical device, an industrial control device, and a touch interactive terminal. No special limitations are made thereto in the embodiments of the present disclosure.

It is to be understood that various forms of processes shown above may be adopted with steps reordered, added, or deleted. For example, the steps described in the present disclosure may be performed in parallel, sequentially, or in different sequences, as long as the desired results of the technical schemes of the present disclosure can be achieved, and no limitation is imposed herein.

What is claimed is:

1. A pixel circuit, comprising:

a drive circuit;

a data write circuit, connected between a data line and the drive circuit and configured to transmit a data voltage of the data line to the drive circuit during a data writing stage; and a light-emitting device, wherein a second electrode of the light-emitting device is connected to the data line, and during a light emission stage, a second power voltage is transmitted to the second electrode of the light-emitting device through the data line;

wherein the drive circuit is connected between a power line and a first electrode of the light-emitting device and is configured to generate a drive current according to a voltage of a control terminal of the drive circuit during the light emission stage to drive the light-emitting device to emit light, wherein the power line is configured to transmit a first power voltage.

2. The pixel circuit according to claim 1, further comprising an auxiliary circuit disposed at a connection path between the second electrode of the light-emitting device and the data line connected to the second electrode of the light-emitting device, wherein the auxiliary circuit is configured to transmit the second power voltage to the second electrode of the light-emitting device during the light emission stage.

3. The pixel circuit according to claim 2, further comprising:

a first light emission control circuit, connected between the power line and a first terminal of the drive circuit; and a second light emission control circuit, connected between a second terminal of the drive circuit and the first electrode of the light-emitting device;

wherein a control terminal of the first light emission control circuit and a control terminal of the second light emission control circuit are connected to a light emission control signal line separately.

4. The pixel circuit according to claim 3, wherein a control terminal of the auxiliary circuit is connected to the light emission control signal line.

5. The pixel circuit according to claim 3, wherein the auxiliary circuit comprises a first transistor, wherein a gate electrode of the first transistor is connected to the light emission control signal line, a first electrode of the first transistor is connected to the second electrode of the light-emitting device, and a second electrode of the first transistor is connected to the data line connected to the second electrode of the light-emitting device.

6. The pixel circuit according to claim 1, further comprising:

a compensation circuit, connected between the control terminal of the drive circuit and a second terminal of the drive circuit and configured to compensate for a threshold voltage of the drive circuit during the data writing stage; and a storage circuit, connected between the control terminal of the drive circuit and the power line and configured to store the voltage of the control terminal of the drive circuit.

7. The pixel circuit according to claim 1, further comprising:

a first initialization circuit, connected between a first initialization signal line and the control terminal of the drive circuit and configured to transmit a first initialization voltage of the first initialization signal line to the control terminal of the drive circuit during an initialization stage; and a second initialization circuit, connected between a second initialization signal line and the first electrode of the light-emitting device and configured to transmit a second initialization voltage of the second initialization signal line to the first electrode of the light-emitting device.

8. The pixel circuit according to claim 7, wherein the first initialization signal line is reused as the second initialization signal line.

9. A display panel, comprising a plurality of data lines and a plurality of pixel circuits according to claim 1, wherein the plurality of pixel circuits are arranged in an array; and in a same pixel circuit, the data write circuit is connected to one of the plurality of data lines, and the second electrode of the light-emitting device is connected to the one of the plurality of data lines;

wherein the plurality of data lines extend in a first direction and are arranged in a second direction, the first direction and the second direction intersect each other, and each of the plurality of data lines is connected to the data write circuits of the pixel circuits in a same column among the plurality of pixel circuits; each data line is configured to transmit the data voltage and the second power voltage in a time-sharing manner.

10. The display panel according to claim 9, further comprising a plurality of signal selection circuits, wherein each of the plurality of signal selection circuits is connected to a respective data line of the plurality of data lines, and is configured to transmit the data voltage and the second power voltage to the respective data line in a time-sharing manner.

11. The display panel according to claim 10, further comprising a first connection line and a second connection line, wherein a plurality of input terminals of each of the plurality of signal selection circuits are connected to the first connection line and the second connection line, respectively, an output terminal of each of the plurality of signal selection circuits is connected to the respective data line, and the first connection line and the second connection line are each configured to connect to a drive chip to enable the drive chip to send the data voltage or the second power voltage to the respective data line.

12. The display panel according to claim 11, wherein each of the plurality of signal selection circuits is configured to be turned on in a time-sharing manner;

wherein during the data writing stage, each of the plurality of signal selection circuits enables the first connection line to be connected to the respective data line so that the data voltage of the first connection line is transmitted to the respective data line; and during the light emission stage, each of the plurality of signal selection circuits enables the second connection line to be connected to the respective data line so that the second power voltage of the second connection line is transmitted to the respective data line.

13. The display panel according to claim 10, wherein each of the plurality of signal selection circuits comprises a second transistor and a third transistor;

wherein a first electrode of the second transistor is configured to access the data voltage, a second electrode of the second transistor is connected to the respective data line, and a gate electrode of the second transistor is connected to a first switch control signal line;

wherein a first electrode of the third transistor is configured to access the second power voltage, a second electrode of the third transistor is connected to the second electrode of the second transistor, and a gate electrode of the third transistor is connected to a second switch control signal line;

wherein a first switch control signal of the first switch control signal line is configured to transmit an effective level signal during the data writing stage and transmit an ineffective level signal during the light emission stage, and a second switch control signal of the second switch control signal line is configured to transmit an ineffective level signal during the data writing stage and transmit an effective level signal during the light emission stage.

14. The display panel according to claim 13, wherein the second electrodes of a part of light-emitting devices are connected together, and the part of light-emitting devices emit light of a same color.

15. The display panel according to claim 13, wherein the second electrodes of a part of light-emitting devices are connected to a same data line, and the part of light-emitting devices emit light of a same color.

16. The display panel according to claim 9, further comprising a plurality of cathode electrode blocks, wherein the second electrode of the light-emitting device in one of the plurality of pixel circuits is one cathode electrode block of the plurality of cathode electrode blocks, and the cathode electrode block is configured to access the second power voltage.

17. The display panel according to claim 16, wherein the cathode electrode blocks of the light-emitting devices in a same column are connected together to form a cathode electrode strip, and each cathode electrode strip is connected to a respective one of the plurality of data lines.

18. The display panel according to claim 16, further comprising a wire; wherein the cathode electrode blocks of the light-emitting devices of a same emitted color in a same column are connected together through the wire to form one cathode electrode strip, and each cathode electrode strip corresponds to a respective one of the plurality of data lines.

19. A pixel circuit, comprising:

a light-emitting device wherein a second electrode of the light-emitting device is connected to a data line;

a drive circuit, connected between a power line and a first electrode of the light-emitting device and configured to generate a drive current according to a voltage of a control terminal of the drive circuit to drive the light-emitting device to emit light, wherein the power line is configured to transmit a first power voltage;

a data write circuit, connected to the drive circuit and configured to transmit a data voltage to the drive circuit; and an auxiliary circuit, connected to the second electrode of the light-emitting device and configured to transmit a second power voltage to the second electrode of the light-emitting device.

20. The pixel circuit according to claim 19, wherein the data write circuit is connected between a data line and the drive circuit, and the auxiliary circuit is connected between the second electrode of the light-emitting device and the data line.

* * * * *